US012656164B2

(12) United States Patent
Landatxe Zugarramurdi et al.

(10) Patent No.: US 12,656,164 B2
(45) Date of Patent: Jun. 16, 2026

(54) CAPACITIVE SENSOR FOR MEASURING THE LEVEL OF A SUBSTANCE IN A TANK

(71) Applicant: CEBI ELECTROMECHANICAL COMPONENTS SPAIN, S.A., Villatuerta (ES)

(72) Inventors: Jose Luis Landatxe Zugarramurdi, Villatuerta (ES); Sergio Diez Garcia, Villatuerta (ES); Enrique Breton Cristobal, Villatuerta (ES); Javier Garcia Izaguirre, Villatuerta (ES); Jorge Machin Mindan, Villatuerta (ES)

(73) Assignee: CEBI ELECTROMECHANICAL COMPONENTS SPAIN, S.A., Villatuerta (ES)

( * ) Notice: Subject to any disclaimer, the term of this patent is extended or adjusted under 35 U.S.C. 154(b) by 328 days.

(21) Appl. No.: 18/262,605

(22) PCT Filed: Dec. 23, 2021

(86) PCT No.: PCT/ES2021/070930
§ 371 (c)(1),
(2) Date: Jul. 24, 2023

(87) PCT Pub. No.: WO2022/162259
PCT Pub. Date: Aug. 4, 2022

(65) Prior Publication Data
US 2024/0426646 A1 Dec. 26, 2024

(30) Foreign Application Priority Data
Jan. 26, 2021 (ES) .................................. 202130058

(51) Int. Cl.
*G01F 23/263* (2022.01)

(52) U.S. Cl.
CPC .......... *G01F 23/263* (2013.01); *G01F 23/265* (2013.01)

(58) Field of Classification Search
CPC ............................................... G01F 23/26–268
See application file for complete search history.

(56) References Cited

U.S. PATENT DOCUMENTS

| | | | | |
|---|---|---|---|---|
| 6,823,730 B2 * | 11/2004 | Buck | ..................... | G01F 23/266 |
| | | | | 73/304 C |
| 7,798,586 B2 * | 9/2010 | Watanabe | ............ | B41J 2/17566 |
| | | | | 347/17 |
| 11,002,586 B2 * | 5/2021 | Rondano | ............... | G01F 23/265 |

FOREIGN PATENT DOCUMENTS

| | | |
|---|---|---|
| EP | 1573280 B1 | 11/2010 |
| ES | 2272759 T3 | 5/2007 |

(Continued)

OTHER PUBLICATIONS

International Search Report for Corresponding International Application No. PCT/ES2021/070930, Mar. 22, 2022, 2 pages.

*Primary Examiner* — Justin N Olamit
(74) *Attorney, Agent, or Firm* — LUCAS & MERCANTI, LLP

(57) ABSTRACT

A capacitive sensor for measuring the level of a substance in a tank is provided, which has a motherboard with a plurality of layers (1a, 1b, 1c, 1d, 1e), wherein each layer (1a, 1b, 1c, 1d, 1e) has one or more plates with components, such as measuring electrodes (2), microcontroller (3), and tracks (4) for connecting the measuring electrodes (2) to the microcontroller (3), wherein the capacitive sensor has a first layer (1a) which in turn has a plate having a plurality of linearly distributed measuring electrodes (2), wherein all the tracks (4) for connecting the measuring electrodes (2) to the microcontroller (3) has the same shape and length, and are surrounded by at least one guard plate (8) and optionally at (Continued)

least one shielding plate (7), both made of a conductive material.

16 Claims, 6 Drawing Sheets

(56)                    References Cited

FOREIGN PATENT DOCUMENTS

| | | | |
|---|---|---|---|
| ES | 2702235 | T3 | 2/2019 |
| JP | 2005351688 | A * | 12/2005 |
| WO | 2008080865 | A2 | 7/2008 |

* cited by examiner

CAPACITIVE SENSOR FOR MEASURING THE LEVEL OF A SUBSTANCE IN A TANK

CROSS REFERENCE TO RELATED APPLICATION

This Application is a 371 of PCT/ES2021/070930, filed on Dec. 23, 2021, which claims the benefit of Spanish Patent Application No. P202130058, filed on Jan. 26, 2021, each of which are incorporated herein by reference.

TECHNICAL FIELD

The object of the present invention relates to a capacitive sensor for measuring the level of a substance (generally a liquid) in a tank or reservoir.

The capacitive sensor object of the present invention offers an optimal level of reliability in measurements, as well as excellent protection against electromagnetic noise that could distort the precise measurement of the level of the liquid in the tank.

The capacitive level sensor for a substance in a tank object of the present invention is applicable in the industry of measurement systems for industrial installations, and more specifically in systems for measuring the level of liquids in tanks typical of the automotive sector in which measurement standards are more demanding in terms of precision.

STATE OF THE ART

Capacitive systems for measuring the level of liquids in tanks based on the arrangement of electrodes submerged in the liquid present in the tank and on the measurement of capacitance variation between said electrodes are known today.

Some of these systems, such as the one described in document WO 2008080865 A2, are based on the introduction of two linear electrodes parallel to the direction of variation of the liquid level in the tank. These systems have the advantage of having a high resolution in measuring level variation, although they have several drawbacks. First, if reference electrodes are not used, with one of the reference electrodes being completely submerged in the liquid medium and the other being in air, it is not possible to determine the level of the liquid, since at a constant level of the medium, the capacitance value between the electrodes changes with the dielectric properties of both the medium and the insulating substrate on which the electrodes are placed, which properties are influenced by factors such as instantaneous humidity or temperature, or more slowly due to the progressive aging of the insulating materials. Second, the linear electrodes work like an antenna, being able to capture electromagnetic disturbances which would be conducted to the measurement controller of the sensor, causing false readings or even the complete impossibility of performing measurement. Third, the tracks leading to the "wet" reference electrode also couple with the liquid when its level rises, causing the capacitance value of the submerged reference electrode to vary, which introduces hard-to-correct non-linearities in the response.

There is another type of capacitive level sensors, such as the one described in document EP 1573280 B1, based on an array of discrete electrodes aligned in the direction of variation of the level of the liquid in the tank. This type of capacitive sensor solves the mentioned problems with respect to linear electrodes, since this array of discrete electrodes are less likely to form antennas due to their geometry, and moreover make reference electrodes redundant (in a submerged medium and in a dry medium), since they allow adopting a strategy based on sequentially measuring the "distributed" capacitance value existing between each of the electrodes of the formation (acting as a measuring electrode or a first armature of the capacitor) and the rest of the electrodes of the formation, these being connected "en bloc" to one and the same known potential, and therefore acting as a second armature of the capacitor. The electrodes in which the capacitance is high are facing the liquid medium, whereas those that show capacitance comparable or close to their initial value in air (which can be stored in the memory of the controller by way of individual reference for each electrode) are not facing the medium.

However, capacitive sensors of this type which are based on an array of discrete electrodes also have some drawbacks derived from the fact that it is necessary to have conductive tracks on the face opposite the motherboard substrate (PCB for Printed Circuit Board), from the corresponding input of the controller to each measuring electrode. These tracks couple with the rest of the electrodes, as well as with the liquid medium and with any other adjoining conductors that are at different potentials along the length of said tracks. This generates several problems. If the electrodes that are not performing measurement are connected, as usual, to the system ground, a significant base capacitance (capacitance when not facing the liquid medium) is added to the electrode which is in measurement mode, which is increased if, also as usual, there are also other nearby conductors grounded. These base capacitances with respect to ground, as well as any other parasitic capacitances in which said tracks intervene, are different for each electrode, and furthermore vary significantly with temperature or humidity, since these cause the dielectric properties of the substrate to vary. This causes changes in the response comparable to those induced by the variation in the level of the liquid medium, these changes being different for each electrode, with different laws of variation, which makes it very difficult to establish effective compensation laws for the sensor as a whole. In addition, the connection tracks couple with the medium, causing the response of each electrode to vary continuously with the height of the liquid, once the level of the liquid has exceeded the level of the electrode, reaching different final values for each electrode, as occurs with the base capacitance. The connection tracks are susceptible to external electromagnetic disturbances, as well as to capacitive couplings with external grounded elements.

OBJECT OF THE INVENTION

In order to solve the drawbacks mentioned above, the present invention relates to a capacitive sensor for measuring the level of a substance in a tank.

The capacitive sensor for measuring the level of a substance in a tank object of the present invention comprises a motherboard (PCB) with a plurality of layers. Each layer comprises one or more areas with components such as measuring electrodes, electronic signal conditioning circuit, and tracks for connecting the measuring electrodes to the electronic signal conditioning circuit.

Therefore, the capacitive sensor comprises a first layer which in turn comprises an area comprising a plurality of linearly distributed measuring electrodes.

In a novel manner, in the capacitive sensor object of the present invention, all the tracks for connecting the measuring electrodes to the electronic signal conditioning circuit:

comprise the same shape and length, and;

are surrounded by at least one guard plate and optionally at least one shielding plate, both made of a conductive material, the guard plate being subjected to a guard voltage to prevent coupling between the tracks with the medium and with any adjoining conductor which is at a different potential such that it may influence the capacitance measured by the measuring electrodes; and the shielding plate being connected to ground for the electromagnetic shielding of the tracks.

Guard plate and shielding plate are different names for a plate made of a conductive material for shielding the tracks and optionally other components of the motherboard of the capacitive sensor.

The at least one guard plate and/or the at least one shielding plate can be made of copper and/or tin.

The guard plate can be connected to a guard voltage, such that if an electrode and the corresponding track are set at the measuring voltage, it is possible to set the remaining tracks at one the same voltage as the guard plate by means of the electronic signal conditioning circuit.

The at least one shielding plate can be connected to ground.

Since all the tracks have the same shape and length, all of them have the same base capacitance in relation with adjoining conductors whereby they also have, within a relatively narrow margin, the same evolution with respect to variations in the dielectric constant of the environment such as, for example, variations induced by temperature or humidity. This facilitates possible calibration or compensation strategies.

Moreover, the tracks being surrounded by guard plates allows, on one hand, preventing or at least minimizing the coupling of the tracks for the connection of the electrodes with the medium (for example, liquid medium) the level of which is to be measured, reinforcing the "equalization" effect of the response of the electrodes, furthermore the inclusion of the shielding plate provides protection against electric and electromagnetic fields that may affect the measurement, providing a high-precision sensor particularly indicated for the automobile industry which requires greater precision in sensor measurement.

Prevention or at least minimization of the undesired coupling of said tracks with the rest of the adjoining conductors in the printed circuit of the motherboard (PCB) is allowed, so the influence on the measurement of the variations in the properties of the printed circuit substrate is minimized. If the metallic plates (guard and/or shielding plates) are not provided, the equalization of the base capacitance when the sensor is not facing the medium would be carried out at the expense of increasing said base capacitance, which is extremely unfavorable for the signal/noise ratio.

Moreover, prevention or minimization of the coupling of external electromagnetic disturbances with said tracks ("antenna effect") is allowed.

In short, the combination of tracks with the same shape and length with the shielding (guard) plates allows obtaining:

smaller and more equalized base capacitances;

more uniform responses of the individual measuring electrodes since they are facing the medium, without influence from the rest of the "wet" electrodes and without additional variation as the level gradually rises, and;

greater immunity to external disturbances of any type, robustly obtaining a signal/noise ratio sufficient for a correct operation of the sensor device.

The high degree of equalization of the response of the different measuring electrodes of the capacitive sensor, regardless of the position thereof in the sensor, as well as the stability provided by reduction of drifts of the dielectric properties of the substrate with temperature, humidity, or aging (main reasons for the drifts), means that it is not necessary to have reference electrodes in distal or proximal positions of the structure, as occurs in those structures which are not made up of multiple sensor elements, but rather of linear electrodes, or in those other structures which, even though they consist of structures with discrete sensor elements, suffer from significant drifts which can even reach the order of the useful signal induced by the presence of the liquid, making comparison with a submerged reference electrode and with another non-submerged reference electrode imperative, to enable determining whether or not the change in the reading of an electrode is due to the presence of the liquid.

In this way, for the present invention, the capacitive value of each measuring electrode can simply be compared with a reference value typical of each measuring electrode, stored in the memory of the electronic signal conditioning circuit, in order to know whether or not a given electrode is facing the medium. This would be equivalent to performing an "autozero" of the system when the measuring electrodes are in contact with air, subtracting from the output value of each measuring electrode the value measured in that condition, thus taking the output to zero "in air" and subsequently using the subtraction thus calculated as an output signal.

Another advantage of this solution is that, for the same reasons mentioned above, it is independent of the dielectric constant of the fluid or medium the level of which is to be measured, with the sensitivity limit being marked by the residual variation of the reading in the "dry" state of each electrode, which is very small. In fact, different liquids will provide different absolute capacitance values for the individual electrodes, but the comparison method will work as long as the difference compared to the initial value ("dry" electrode) is above the noise threshold of the system.

According to a first embodiment of the invention, the capacitive sensor comprises a second layer comprising a shielding plate; a third layer comprising the tracks for connecting the measuring electrodes to the electronic signal conditioning circuit, and a fourth layer comprising a guard plate. The first layer and the second layer are the outer layers of the motherboard (PCB), and the third layer is arranged between the second layer and the fourth layer.

According to a possible embodiment of the invention, the capacitive sensor comprises a second layer comprising a shielding plate and a third layer comprising a guard plate, as well as the tracks for connecting the measuring electrodes to the electronic signal conditioning circuit. Each track is inserted into a corresponding elongated window made on the guard plate. The first layer and the second layer are the outer layers of the motherboard (PCB), and the third layer is arranged between the first layer and the second layer.

This embodiment described above has the advantage of simplifying the motherboard (and thereby reducing its cost) by unifying the layer comprising the tracks with the board comprising the guard plate.

The insertion of the tracks in the guard plate has hardly any negative effect on the shielding function of said plate, given that every time an electrode (and the corresponding track) is set at the measuring voltage, it is possible to set, by means of a switching device, the remaining tracks at one the same voltage of the guard plate (guard voltage), so it is as if said remaining tracks are part of the guard plate and not interrupted. This solution is particularly applicable to sensors with low measurement levels, and accordingly with a short sensor element with few electrodes and short tracks, since in these types of sensors, on one hand, the geometrical and electrical disturbance of the guard plate due to the insertion of the tracks is minimized and, on the other hand, since the tracks are short, the value of their capacitance with respect to any adjoining conductor is lower compared to the capacitance value of the wet electrode.

According to an aspect of the invention, a ground electrode is arranged between every two measuring electrodes. All the ground electrodes are physically and electrically connected to one and the same electric potential.

The feature described in the preceding paragraph prevents the need for, as occurs with other capacitive sensors of the state of the art, the medium being necessarily a conductive medium and acting as a "virtual electrode", requiring grounding or connection in some way to the circuit for this circuit diagram to work, which is a clear drawback of this strategy given that not all the media of interest are conductive (including, for example, oils or diesel or gasoline type fuels, which are insulators).

According to the feature of intercalating ground electrodes between the measuring electrodes, the measuring electrodes and the tracks which are not performing measurement and the guard plate are preferably set at the guard voltage to prevent coupling of the tracks with the medium; and the ground electrodes are preferably connected to ground so that they act as a second armature.

According to another aspect of the invention, in addition to the measuring electrodes of the first layer, the capacitive sensor comprises an additional layer which in turn comprises three or more linearly distributed measuring electrodes, wherein the first layer and the mentioned additional layer of measuring electrodes are the outer layers of the motherboard (PCB). The sensitivity of the capacitive sensor is increased by means of this feature. Preferably, the measuring electrodes of the first layer and of the additional layer are interconnected in pairs, thereby increasing the surface of the armatures.

According to a possible embodiment, the signal conditioning electronics are arranged in an area located in the first layer adjacent to the area comprising the measuring electrodes. In the case of the first embodiment, the fourth layer preferably comprises a shielding plate for the signal conditioning electronics, wherein said shielding plate for the electronic signal conditioning circuit is at a voltage different from the voltage of the guard plate, preferably a the ground voltage of the system.

As an alternative to what is mentioned in the preceding paragraph, the electronic signal conditioning circuit can be arranged in an area located in the second layer attached to a shielding plate arranged in said layer.

As mentioned in the preceding paragraph, the first layer may comprise a shielding plate for the electronic signal conditioning circuit, wherein said shielding plate for the electronic signal conditioning circuit is at a different electric potential than the measuring electrodes.

As an alternative to what is mentioned in the preceding paragraph, the third layer (comprising the tracks) may comprise a shielding plate for the electronic signal conditioning circuit, wherein said shielding plate for the electronic signal conditioning circuit is at a different potential than the guard plate and/or the tracks for connecting the measuring electrodes to the electronic signal conditioning circuit, commonly at the ground voltage.

DESCRIPTION OF THE FIGURES

The following figures have been included as part of the explanation of at least one embodiment of the invention.

DETAILED DESCRIPTION OF THE INVENTION

As mentioned above, the present invention relates to a capacitive sensor for measuring the level of a substance in a tank.

The capacitive sensor object of the present invention is built on a motherboard (PCB) made up of a plurality of superimposed layers (1*a*, 1*b*, 1*c*, 1*d*, 1*e*).

Each of the layers (1*a*, 1*b*, 1*c*, 1*d*, 1*e*) of the motherboard may comprise one or more plates for performing different functions.

Figure 1:
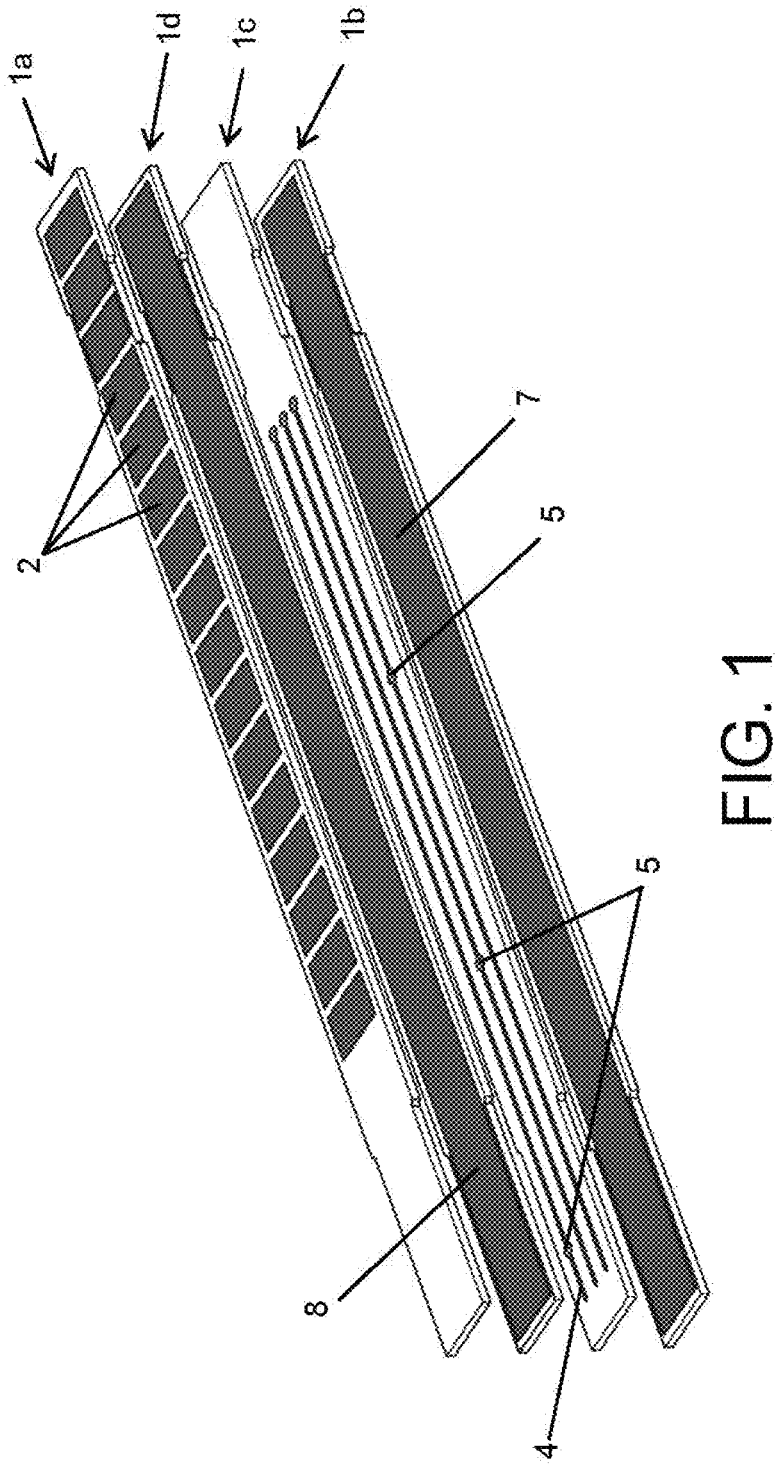
FIG. 1 shows an exploded perspective view of the different layers making up the motherboard of the capacitive sensor, according to a first embodiment of the invention.
Figure 2:
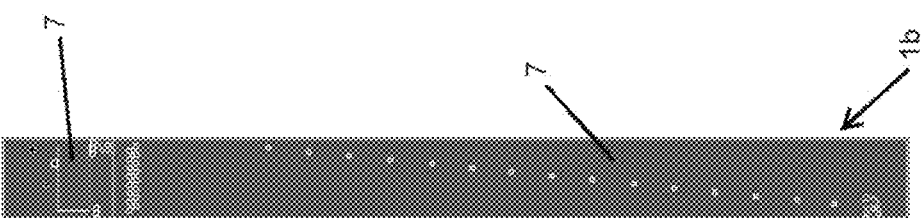
FIG. 2 shows a schematic exploded plan view of the different layers of the motherboard of the capacitive sensor, according to the first embodiment.
Figure 2:
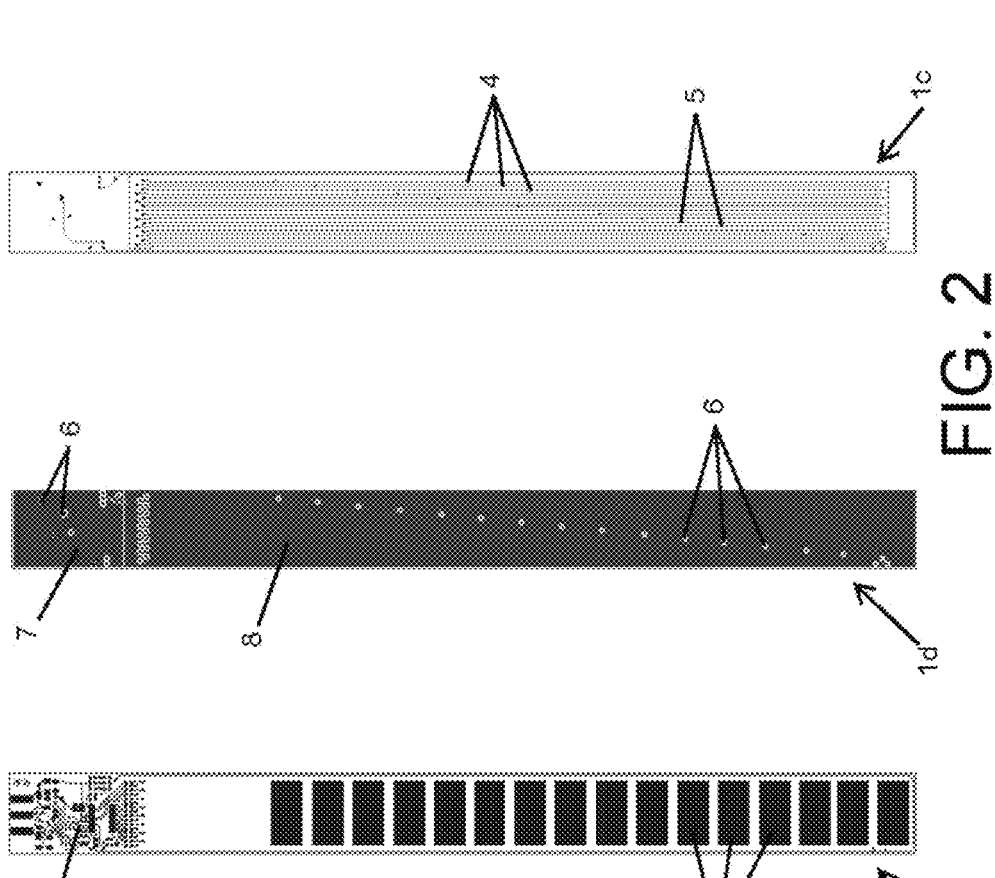

According to a first embodiment of the capacitive sensor shown in FIG. 1 and FIG. 2, the motherboard comprises four superimposed layers (1*a*, 1*b*, 1*c*, 1*d*).

A first sensing layer (1*a*) comprises two areas. There is a plurality of linearly distributed measuring electrodes (2) in a first area. The electronic signal conditioning circuit (3) of the motherboard is arranged in a second area of the first layer (1*a*).

A second shielding layer (1*b*), opposite the first sensing layer (1*a*), comprises two plates made of a conductive material. One of these plates is a shielding plate (7) for shielding the tracks (4) connecting each of the measuring electrodes (2) to the electronic signal conditioning circuit (3) of the motherboard from external electrical and electromagnetic fields. The other one of these plates is also a shielding plate (7) in an area adjacent to the foregoing, for shielding the electronic signal conditioning circuit (3) located in the first layer (1*a*).

A third layer (1*c*), adjacent to the second layer (1*b*) in the upper portion thereof, comprises an area in which the mentioned tracks (4) connecting each of the measuring electrodes (2) to the electronic signal conditioning circuit (3) are located.

A fourth layer (1*d*) of the capacitive sensor is located between the first layer (1*a*) and the third layer (1*c*). This fourth layer (1*d*) comprises two areas. One of these areas comprises a plate made of a conductive material, said plate being a guard plate (8), for shielding the plate of the third layer (1*c*) comprising the tracks (4) such that the coupling of said tracks (4) with the medium, with the measuring electrodes (2), or with any adjoining conductor which is at a different potential is prevented or minimized. Preferably, said guard plate (8) can be connected to a guard voltage that is substantially equal to the measuring voltage, such that all the tracks are at the same voltage, such that by comparing the capacitive value of each measuring electrode with a reference value typical of each measuring electrode stored in the memory of the electronic signal conditioning circuit, it is determined whether or not an electrode is facing the medium. The other area comprises a shielding plate (7) for shielding the electronic signal conditioning circuit (3) located in the first layer (1*a*).

Each preferably rectangular measuring electrode (2) arranged with its long sides one next to the other connects with a node (5) of a track (4) by means of a conductive element (not depicted) which goes through a corresponding hole (6) of the fourth layer (1*d*) where the guard plate (8) is located, said hole (6) being metalized to establish said conduction, such that the measuring electrodes (2) are connected to the electronic signal conditioning circuit (3), such that the connection between layers is performed by means of the mentioned metalized holes (6).

In all the embodiments of the capacitive sensor object of the present invention, all the tracks (4) have the same length, regardless of whether the node (5) is located at a different height for connection to the corresponding measuring electrode (2).

Likewise, in all the embodiments of the capacitive sensor object of the present invention, all the tracks (4) have the same shape.

Figure 3:
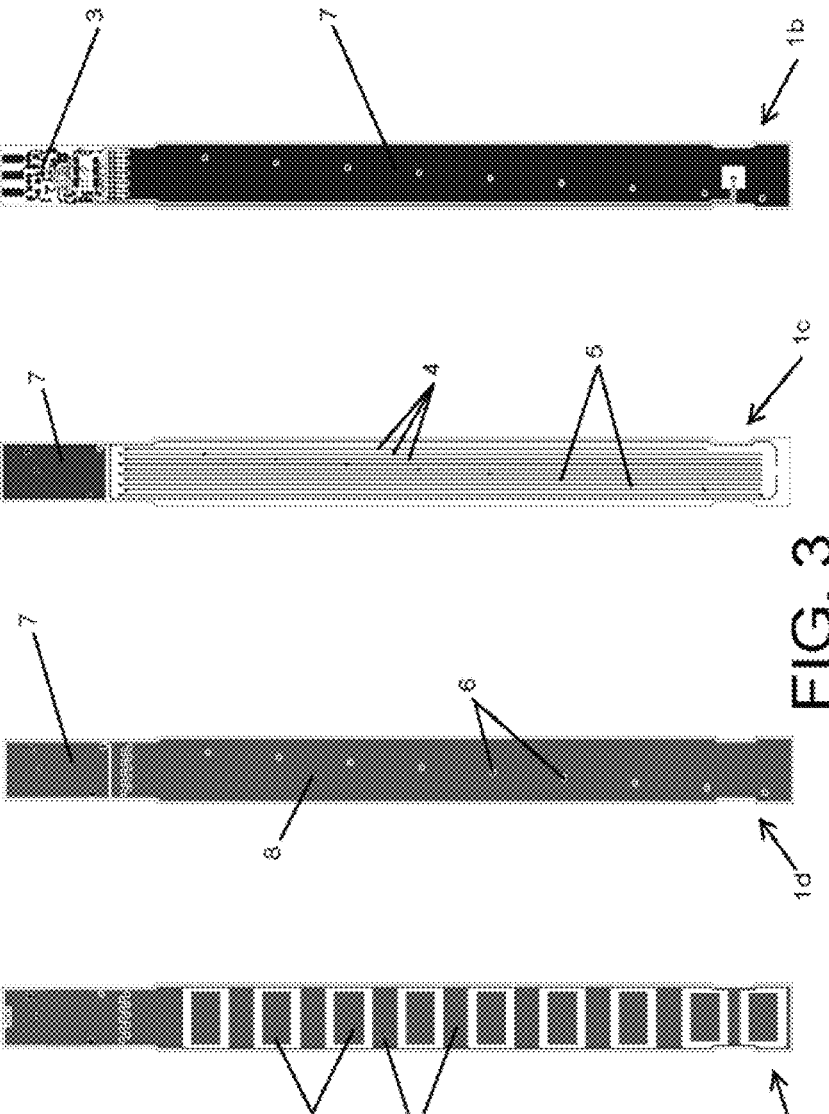
FIG. 3 shows a schematic exploded plan view of the different layers of the motherboard of the capacitive sensor, according to the second embodiment.

FIG. 3 schematically shows the second embodiment of the capacitive sensor object of the present invention.

The second embodiment differs from the first embodiment in that, between every two measuring electrodes (2) of the first layer (1*a*), there is arranged a ground electrode (2'). All the ground electrodes (2') are preferably wider than the measuring electrodes (2), being interconnected to one another around said ground electrodes (2'), as can be seen in FIG. 3. In this way, the ground electrodes (2') are connected (typically to ground) at one and the same potential.

In this way, according to this second embodiment, the set of ground electrodes (2') behaves like a second armature of capacitor, with the first armature being the respective measuring electrodes (2).

Figure 4:
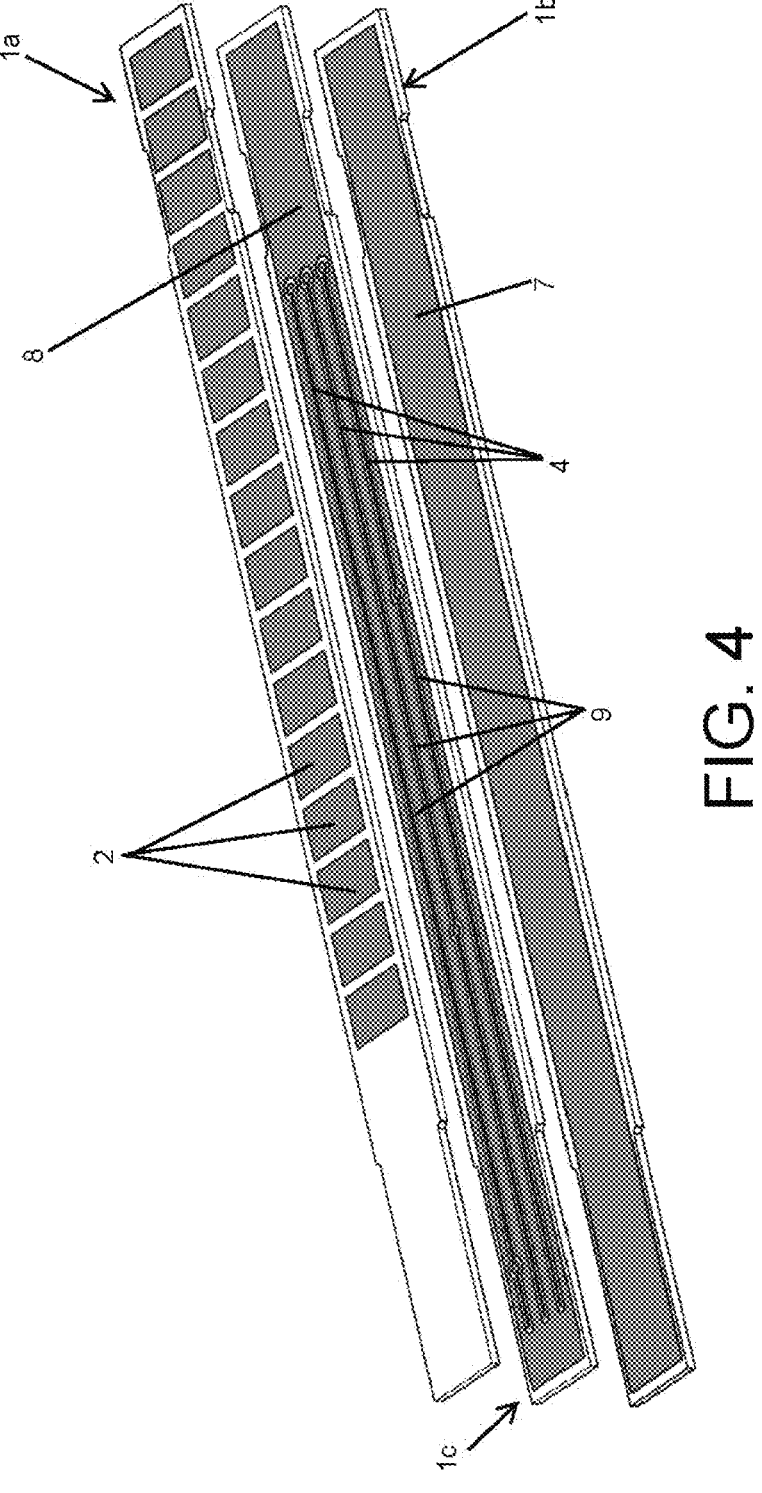
FIG. 4 shows an exploded perspective view of the different layers making up the motherboard of the capacitive sensor, according to a third embodiment of the invention.
Figure 5:
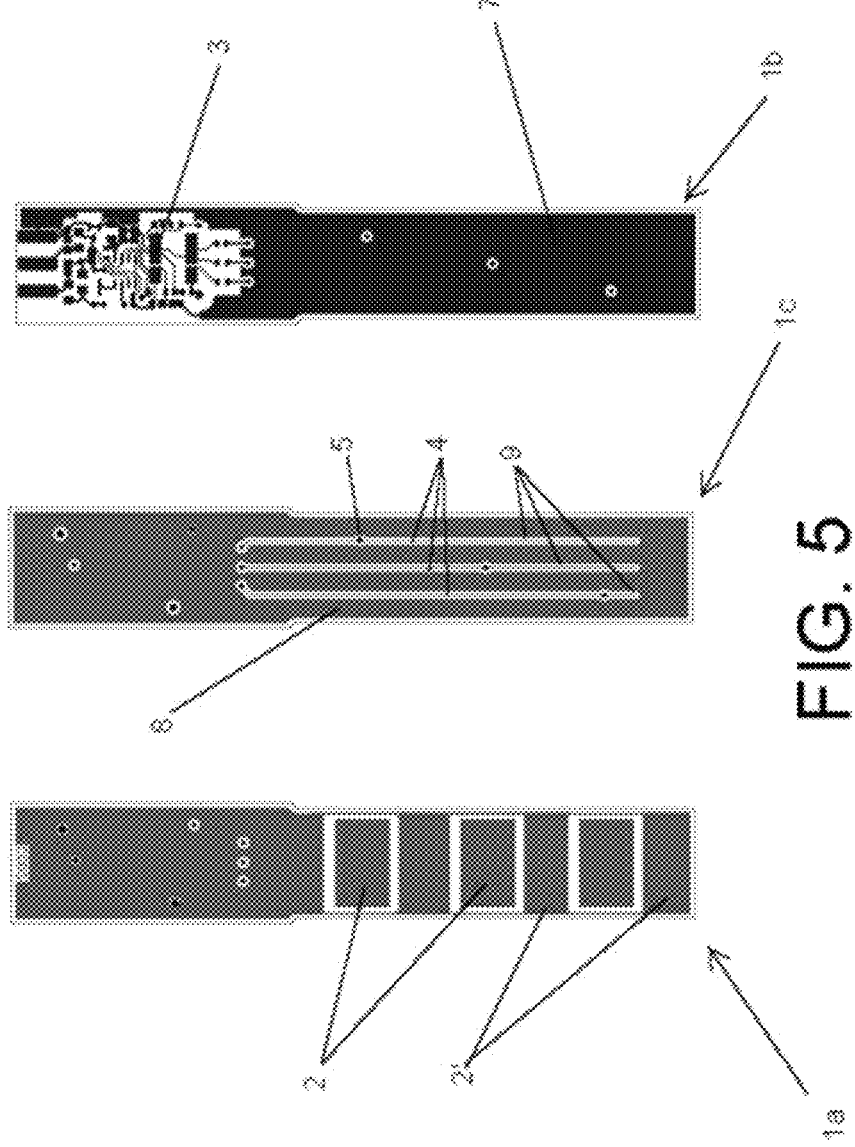
FIG. 5 shows a schematic exploded plan view of the different layers of the motherboard of the capacitive sensor, according to the second and third embodiments.

FIGS. 4 and 5 schematically show the third embodiment of the capacitive sensor object of the present invention.

The third embodiment differs the first embodiment in which the second layer (1*c*) and the fourth layer (1*d*) of the first embodiment are integrated in a single third layer (1*c*) in this third embodiment of the capacitive sensor.

This third layer (1*c*) of the third embodiment comprises the plurality of tracks (4) inserted into corresponding elongated windows (9) or elongated channels made in a guard plate (8).

In turn, in this third embodiment, the electronic signal conditioning circuit (3) can be located in the first layer (1*a*) (as occurs in the first embodiment) or in the second layer (1*b*) comprising a shielding plate (7). Additionally, as can be seen in FIG. 5, in this embodiment, the configuration of ground electrodes (2') in the first layer (1*a*) has been adopted, said configuration likewise being optional.

Figure 6:
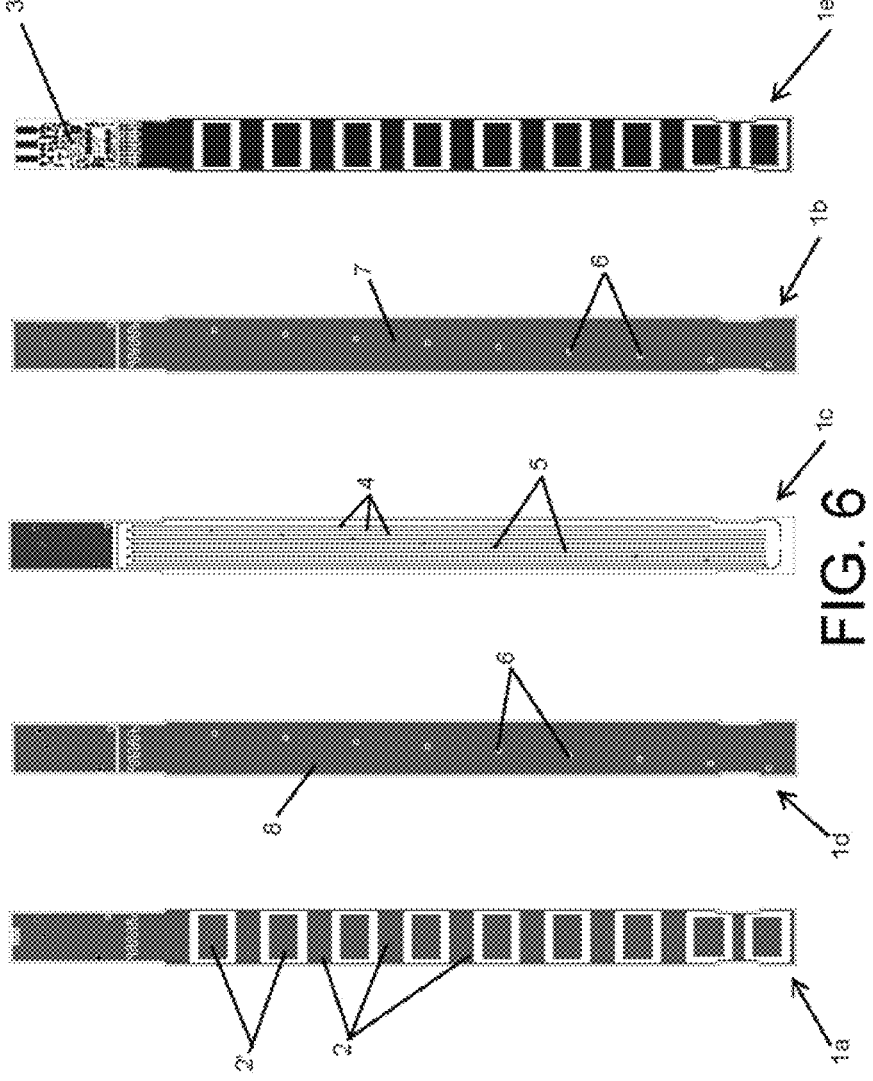
FIG. 6 shows a schematic exploded plan view of the different layers of the motherboard of the capacitive sensor, according to the fourth embodiment.

FIG. 6 schematically shows the fourth embodiment of the capacitive sensor object of the present invention.

The fourth embodiment differs the first embodiment in which there is an additional layer (1*e*) of the motherboard, located externally in a manner adjacent to the second layer (1*b*), on the side opposite to the side on which the third layer (1*c*) contacts the second layer (1*b*).

This additional layer (1*e*), like the first layer (1*a*), is therefore an outer layer of the motherboard.

The additional layer (1*e*), like the first layer (1*a*), is a sensing layer which allows increasing the sensitivity of the system by duplicating the useful surface of the measuring electrodes (2). Therefore, the additional layer (1*e*) comprises a plurality of linearly distributed measuring electrodes (2) connected with the respective tracks (4) of the third layer (1*c*) by means of nodes (5) accessed through perforations (6) in the shielding plate (7) of the second layer (1*b*) which in this case becomes a shielding plate like the guard plate (8). For this last embodiment, as can be seen in FIG. 6, the configuration of the second embodiment of the FIG. 3 has likewise been adopted, i.e., ground electrodes (2') have been included between the sensing electrodes (2), both in the first layer (1*a*) and in the additional layer (1*e*), this optional arrangement being more suitable in the case of working with insulating or low-conductivity fluids.

Four embodiments of the invention, each of them with its own features, have been described in this section with the help of the figures. However, the capacitive sensor object of the present invention can have combinations of the features of the different embodiments, creating various alternative embodiments with features typical of two or more of the embodiments described above.

The invention claimed is:

1. A capacitive sensor for measuring a level of a substance in a tank, comprising:

a motherboard with a plurality of layers including one or more areas of components comprising measuring electrodes, an electronic signal conditioning circuit, and tracks for connecting the measuring electrodes to the electronic signal conditioning circuit, a first layer of the plurality of layers comprising an area including the measuring electrodes, wherein the measuring electrodes are linearly distributed and the tracks for connecting the measuring electrodes to the electronic signal conditioning circuit:

each comprise the same shape and length, and;

are surrounded by a guard plate and at least one shielding plate, each of the guard plate and the at least one shielding plate made of a conductive material, the guard plate being configured to be subjected to a guard voltage substantially equal to a measuring voltage of the measuring electrodes to prevent coupling between the tracks that may influence a capacitance measured by each of the measuring electrodes, and the at least one shielding plate being connected to ground for the electromagnetic shielding of the tracks, and wherein the plurality of layers further comprise a second layer comprising a shielding plate of the at least one shielding plate, a third layer comprising the tracks for connecting the measuring electrodes to the electronic signal conditioning circuit, and a fourth layer comprising the guard plate, wherein the first layer and the second layer are outer layers of the motherboard, and wherein the third layer is arranged between the second layer and the fourth layer.

2. The capacitive sensor according to claim 1, wherein, wherein each track is inserted into a corresponding elongated window made on the guard plate.

3. The capacitive sensor according to claim 1, wherein a ground electrode is arranged between every two measuring electrodes, wherein all the ground electrodes are connected to one and the same electric potential.

4. The capacitive sensor according to claim 3, wherein the ground electrodes are connected to ground.

5. The capacitive sensor according to claim 1, wherein the electronic signal conditioning circuit is configured to measure the capacitance of the each of the measuring electrodes at the measuring voltage by connecting all the measuring electrodes to one and the same voltage.

6. The capacitive sensor according to claim 3, wherein the electronic signal conditioning circuit is configured to measure the capacitance between the each of the measuring electrodes and the ground electrodes.

7. The capacitive sensor according to claim 1, wherein in addition to the first layer, the capacitive sensor comprises an additional layer having an additional plurality of measuring electrodes, wherein the first layer and the additional layer are outer layers of the motherboard.

8. The capacitive sensor according to claim 1, wherein the electronic signal conditioning circuit is arranged in an area located in the first layer adjacent to an area comprising the measuring electrodes.

9. The capacitive sensor according to claim 8, wherein the fourth layer comprises a shielding plate of the at least one shielding plate for the electronic signal conditioning circuit, wherein said shielding plate for the electronic signal conditioning circuit is at an electric potential different from the guard plate.

10. The capacitive sensor according to claim 1, wherein the electronic signal conditioning circuit is arranged in an area located in the second layer attached to a second shielding plate of the at least one shielding plate arranged in said area.

11. The capacitive sensor according to claim 10, wherein the first layer comprises a further shielding plate of the at least one shielding plate for the electronic signal conditioning circuit, wherein said shielding plate for the electronic signal conditioning circuit is arranged adjacent to the area comprising the measuring electrodes.

12. The capacitive sensor according to claim 10, wherein the third layer comprises a third shielding plate of the at least one shielding plate for the electronic signal conditioning circuit, wherein said third shielding plate for the electronic signal conditioning circuit is connected to ground.

13. The capacitive sensor according to claim 1, wherein the measuring electrodes are linearly distributed in a length direction of the motherboard and the tracks extend in the length direction, each of the measuring electrodes being connected by a corresponding one of the tracks to the electronic signal conditioning circuit.

14. The capacitive sensor according to claim 1, wherein the measuring electrodes and the tracks are configured to each be connected to the measuring voltage.

15. A capacitive sensor for measuring a level of a substance in a tank, comprising:

a motherboard with a plurality of layers including one or more areas of components comprising measuring electrodes, an electronic signal conditioning circuit, and tracks for connecting the measuring electrodes to the electronic signal conditioning circuit, a first layer of the plurality of layers comprising an area including the measuring electrodes, wherein the measuring electrodes are linearly distributed and the tracks for connecting the measuring electrodes to the electronic signal conditioning circuit:

each comprise the same shape and length, and;

are surrounded by a guard plate and at least one shielding plate, each of the guard plate and the at least one shielding plate made of a conductive material, the guard plate being configured to be subjected to a guard voltage substantially equal to a measuring voltage of the measuring electrodes to prevent coupling between the tracks that may influence a capacitance measured by each of the measuring electrodes, and the at least one shielding plate being connected to ground for the electromagnetic shielding of the tracks, and wherein the plurality of layers further comprise a second layer comprising a shielding plate of the at least one shielding plate and a third layer comprising the guard plate as well as the tracks for connecting the measuring electrodes to the electronic signal conditioning circuit, wherein each track is inserted into a corresponding elongated window made on the guard plate, wherein the first layer and the second layer are outer layers of the motherboard, and wherein the third layer is arranged between the first layer and the second layer.

16. A capacitive sensor for measuring a level of a substance in a tank, comprising:

a motherboard with a plurality of layers including one or more areas of components comprising measuring electrodes, an electronic signal conditioning circuit, and tracks for connecting the measuring electrodes to the electronic signal conditioning circuit, a first layer of the plurality of layers comprising an area including the measuring electrodes, wherein the measuring electrodes are linearly distributed and the tracks for connecting the measuring electrodes to the electronic signal conditioning circuit:

each comprise the same shape and length, and;

are surrounded by a guard plate and at least one shielding plate, each of the guard plate and the at least one shielding plate made of a conductive material, the guard plate being configured to be subjected to a guard voltage substantially equal to a measuring voltage of the measuring electrodes to prevent coupling between the tracks that may influence a capacitance measured by each of the measuring electrodes, and the at least one shielding plate being connected to ground for the electromagnetic shielding of the tracks, and wherein the electronic signal conditioning circuit is configured to measure the capacitance of the each of the measuring electrodes at the measuring voltage by connecting all the measuring electrodes to one and the same voltage.

* * * * *